United States Patent [19]

Zaugg

[11] Patent Number: 4,522,024
[45] Date of Patent: Jun. 11, 1985

[54] METHOD FOR REDUCING THE AMOUNT OF NOX AND FOR RAISING THE OUTPUT OF A GAS TURBINE POWER STATION OF THE TYPE UTILIZING AN AIR RESERVOIR, AND A GAS TURBINE POWER STATION, OF THIS TYPE, OPERATING IN ACCORDANCE WITH THIS METHOD

[75] Inventor: Paul Zaugg, Baden, Switzerland

[73] Assignee: BBC Brown, Boveri & Company, Limited, Baden, Switzerland

[21] Appl. No.: 415,911

[22] Filed: Sep. 8, 1982

[30] Foreign Application Priority Data

Sep. 18, 1981 [CH] Switzerland ............... 6039/81

[51] Int. Cl.$^3$ ............................................. F02C 7/143
[52] U.S. Cl. ..................................... 60/39.05; 60/727; 60/728
[58] Field of Search ............ 60/39.02, 39.05, 727, 60/728, 39.53, 39.55; 415/179

[56] References Cited

U.S. PATENT DOCUMENTS

| 3,693,347 | 9/1972 | Kydd et al. ............... 60/39.55 |
| 3,795,460 | 3/1974 | Endo et al. ............... 415/179 |
| 3,826,080 | 7/1974 | De Corso et al. .......... 60/39.55 |
| 4,403,477 | 9/1983 | Schwarzenbach ......... 60/727 |
| 4,426,842 | 1/1984 | Collett ..................... 60/728 |

FOREIGN PATENT DOCUMENTS 2020367  11/1979  United Kingdom ............ 60/727

Primary Examiner—Louis J. Casaregola
Attorney, Agent, or Firm—Oblon, Fisher, Spivak, McClelland & Maier

[57] ABSTRACT

The gas turbine power station, which is of the type utilizing an air reservoir, and is operated in accordance with the method for reducing the amount of NO$_x$ and for raising output, possesses an intermediate condensate-vessel and a main condensate-vessel for receiving the condensate which is produced in the compressor-air coolers. From the main condensate vessel, the condensate is introduced into the combustion chambers of the gas turbine, optionally after passing through a recuperator.

1 Claim, 1 Drawing Figure

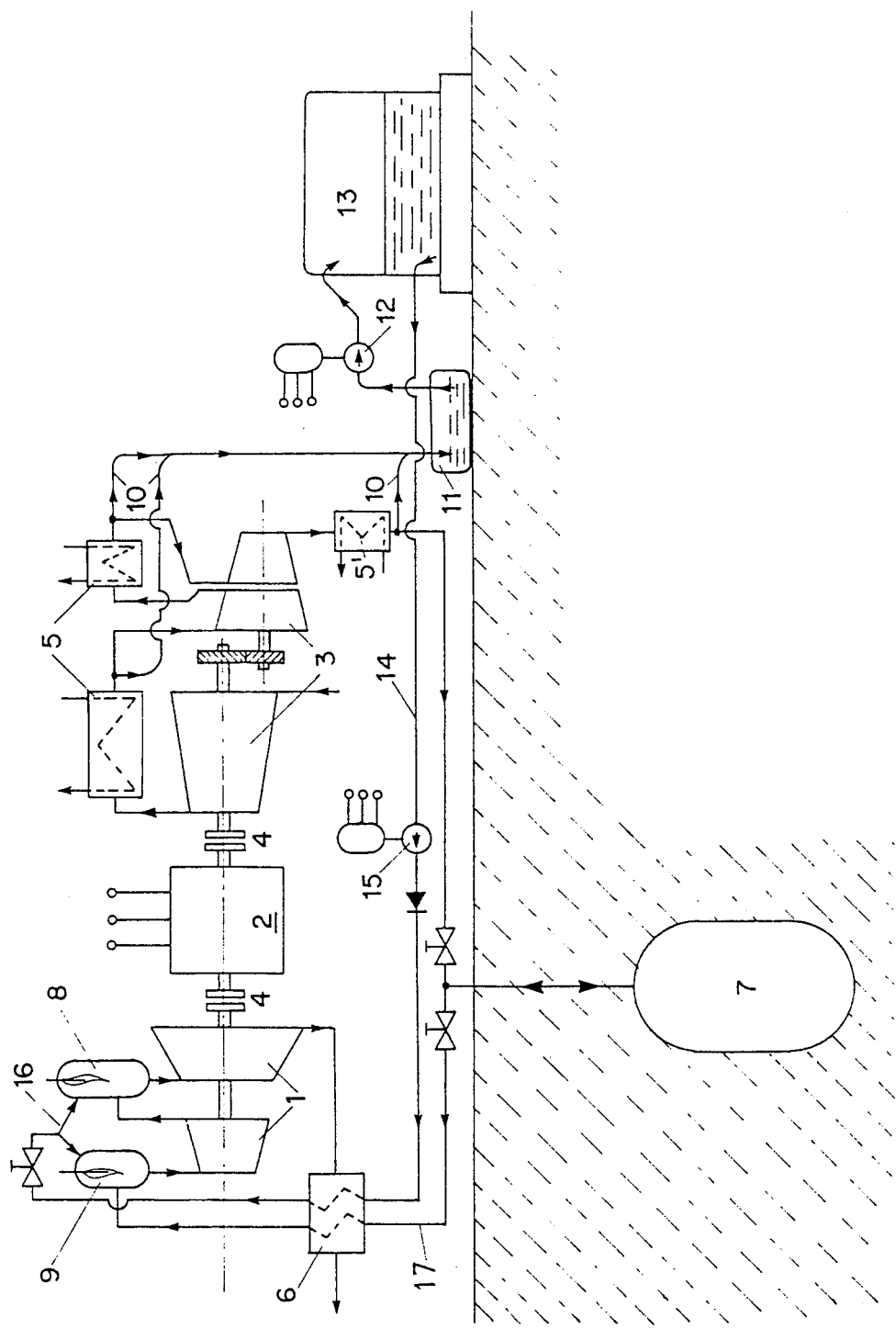

METHOD FOR REDUCING THE AMOUNT OF NOX AND FOR RAISING THE OUTPUT OF A GAS TURBINE POWER STATION OF THE TYPE UTILIZING AN AIR RESERVOIR, AND A GAS TURBINE POWER STATION, OF THIS TYPE, OPERATING IN ACCORDANCE WITH THIS METHOD

BACKGROUND OF THE INVENTION

1. Field of the Invention

The present invention relates to a method for reducing the amount of $NO_x$, and for raising the output, of a gas turbine power station of the type utilising an air reservoir, and a gas turbine power station, of this type, operating in accordance with this method.

2. Description of the Prior Art

For the production of compressed air at a high pressure, such as for example, in the case of gas turbine power stations of the type utilising air reservoirs, two or more compressors are customarily connected in series, the air being led between each two compressors through ihtercoolers and, after the last compressor, through an aftercooler in order to reduce the compressor drive-power and to reduce the volume of the air. Since the air is drawn in from the open environment, it always contains water vapour. If the air temperature remains constant, the amount of water separated out in liquid form increases with rising pressure. For example, at 50 bar final pressure and 20° C., the air retains, in vapour form, only 1/50 of the maximum water content which it can absorb at ambient pressure. At such a high compression, virtually the whole of the water vapour which is drawn in from the environment with the air, thus condenses in the intercoolers and in the aftercooler.

In order to avoid disturbances in the machines and apparatuses, this condensate must be removed from the compressor-circuit by water separators. In the case of a compressor which, for example, draws in 300 kg of air per second at 20° C. and 80% relative humidity, 12.5 $m^3$ of water are produced per hour, as the result of this separation process, which is led away unused by means of a water-removal system. The quality of this condensate approximates that of rainwater.

SUMMARY OF THE INVENTION

The present invention is to use this condensate in an advantageous manner, instead of water of a corresponding quality from external sources, for injection into the combustion chamber of the turbine, with the aim of reducing the formation of $NO_X$ and in order to raise the turbine output.

On account of strict anti-pollution requirements, the reduction of the $NO_x$ content of the turbine exhaust gases is a serious problem. In the case of conventional gas turbines and gas turbines utilising air reservoirs, the $NO_x$ content can be reduced to the permissible proportion by injecting water or steam into the combustion chambers. However, water of the necessary quality is often not available, and its provision and/or pre-treatment is, in such cases, a cost factor which must not be disregarded.

The method according to the invention enables the condensate which is separated from the compressed combustion-air, in the intercoolers and in the aftercooler, to be used for injection purposes, as a result of which that proportion of the heat of compression residing in the water continues to be retained for the turbine's thermodynamic process. If water from an outside source is used, this heat would have to be taken from a heat exchanger within the system, and this creates a loss.

BRIEF DESCRIPTION OF THE DRAWINGS

Various other objects, features and attendant advantages of the present invention will be more fully appreciated as the same becomes better understood from the following detailed description when considered in connection with the accompanying drawing in which like reference characters designate like or corresponding parts throughout the several views, and wherein:

The Sole FIGURE is a schematic view of the power station of the invention.

DETAILED DESCRIPTION OF THE PREFERRED EMBODIMENTS

In the embodiment shown in the drawing, there is a gas turbine power station which is of the type utilising an air reservoir and which is operated in accordance with this method. The station includes a gas turbine 1, a generator 2 and a compressor-group 3 which can be coupled together, or separated one from another, depending on the operating phase, by means of clutches 4. During peak-load periods, the compressor-group 3 is decoupled and the gas turbine 1, which is coupled to the generator 2, receives combustion-air exclusively from an air-reservoir cavern 7, which is constructed underground and is charged by the compressor-group 3 at times when the load is low. At such low load times the compressor-group is driven by the generator 2 which is operated as a motor, assisted also, if necessary, by the gas turbine 1.

An intercooler 5 is installed between the low-pressure stage and the medium-pressure stage, and also between the latter and the high-pressure stage of the compressor-group, while an aftercooler 5' is installed downstream of the high-pressure stage of the compressor-group. From these coolers, the condensate is led away, via condensate lines 10, into an intermediate condensate-vessel 11, from which it is conveyed, by an electric pump 12, into a main condensate-vessel 13. While the turbine is operating, the condensate is conveyed, by an electric pump 15, from the main reservoir 13, via a condensate feed line 14 and via a recuperator 6, into injection devices 16 of a low-pressure combustion chamber 8 a high-pressure combustion chamber 9 of the gas turbine. In the recuperator 6 which is also provided for the purpose of preheating, by means of the turbine exhaust-gases, the air which is delivered through a compressor-air line 17 from the cavern 7, or from the compressor-group 3, the injection-water is evaporated in a tube-coil, this saving additional fuel which would otherwise have to be expended on the process of evaporating the injection-water. In addition to reducing the $NO_x$ content to the desired amount, the steam which is introduced into the combustion chambers gives rise to a certain increase in the turbine power output, so that the method also enhances the operating economy of the power station.

As a rule, the condensate can be used for the injection process without further pre-treatment, while if there is particularly severe air-pollution, the expenditure required for treatment will, at most, be very low.

The mass-flow of the water produced in the water separators of the coolers 5 and 5' is a function of the ambient temperature and of the relative atmospheric humidity. It varies markedly with the season of the year. In particular, it can happen that during the winter the quantity of water which is produced daily is incapable of meeting the requirement of the turbine, whereas during the summer the amount of condensate produced will exceed the requirement. The main vessel 13 must accordingly be made sufficiently large to ensure that it balances out the fluctuating rate of condensate production over a comparatively long time.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for reducing the amount of $NO_x$, and for raising the output of a gas turbine power station of the type having a gas turbine, a generator/motor, a compressor-group, moisture condenser means associated with said compressor group and an air reservoir, said method comprising the steps of:

collecting in an intermediate condensate tank the moisture condensed in said condenser means;

storing said collected moisture in a main condensate tank;

heating exchanging a portion of said stored moisture with waste gas from said turbine to evaporate said moisture; and introducing said evaporated moisture into combustion chamber means of said turbine.

* * * * *